Jan. 23, 1968   S. L. HAYWARD   3,365,001
TRACTORS

Filed Dec. 4, 1964   2 Sheets-Sheet 1

INVENTOR
STUART L. HAYWARD
By
Orland M. Christensen
ATTORNEY

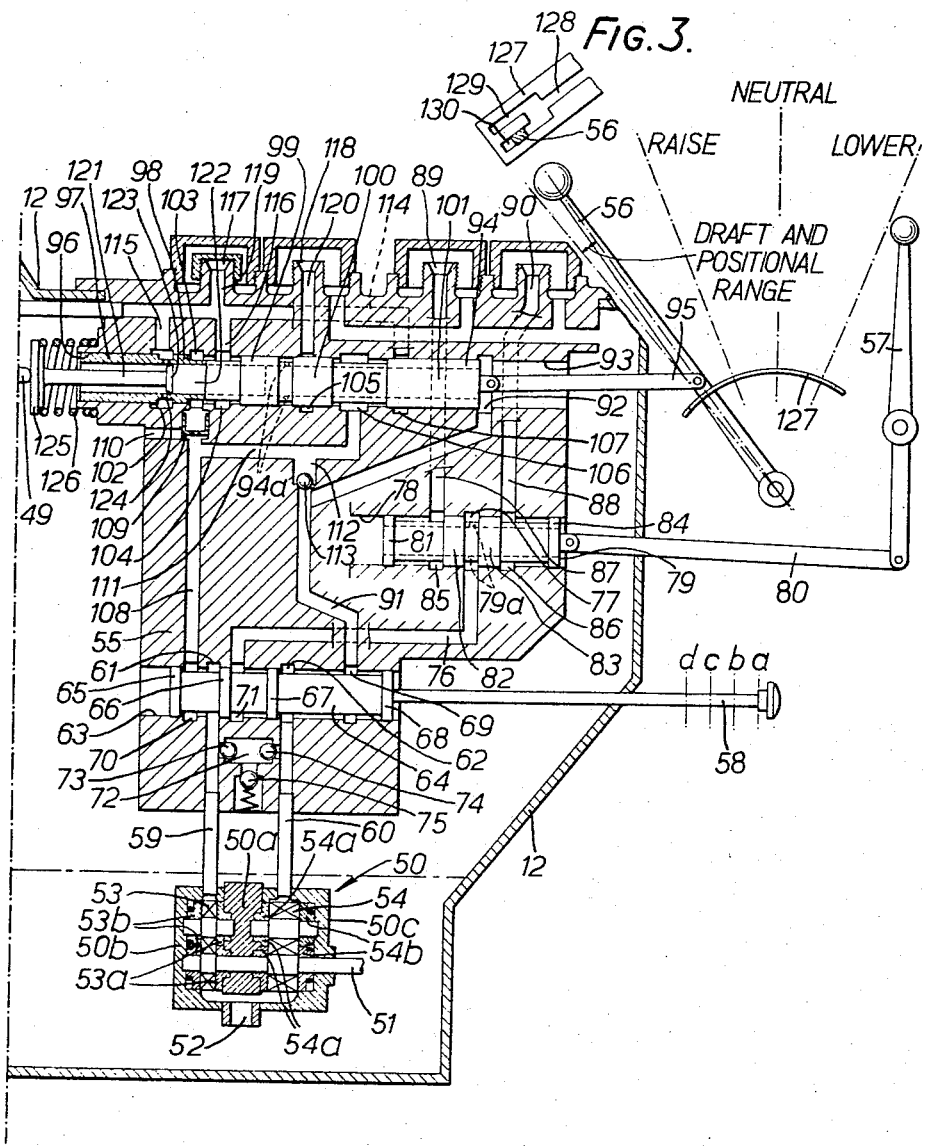

United States Patent Office 3,365,001
Patented Jan. 23, 1968

3,365,001
TRACTORS
Stuart L. Hayward, Cheltenham, England, assignor to Dowty Hydraulic Units Limited, Cheltenham, England, a British company
Filed Dec. 4, 1964, Ser. No. 415,941
Claims priority, application Great Britain, Dec. 19, 1963, 50,190/63
16 Claims. (Cl. 172—7)

ABSTRACT OF THE DISCLOSURE

A tractor which is provided with a power lift and a plough-carrying hitch linkage operable by the power lift, includes a tandem pump unit itself incorporating two supply pumps of different capacities.

The power lift is operable under draft control and positional control by pressure fluid supplied only by the smaller of the two pumps, but for operation of the power lift under conditions other than draft or positional control the deliveries of both pumps are directed to the power lift.

---

This invention relates to tractors and like agricultural vehicles.

According to this invention, a tractor or like agricultural vehicle is provided with a fluid-pressure-operable power lift and also with a control means for the draft control of an implement, for example, a plough, connected to the tractor, the power lift and the draft control means being supplied with pressure fluid for operation by a tandem pump unit itself comprising two pumps contained in a casing common to both. The two pumps may be arranged to be driven by a single shaft, common to both, and together arranged to supply pressure fluid at relatively high flow for control of the power lift and also for the operation of other external services, but when the draft control means only is operating for draft control of the implement, thus utilising pressure fluid at a relatively low flow rate, only one pump of the unit is caused to deliver such flow whilst delivery from the other pump of the unit by-passes to drain.

The tandem pump unit may be of gear-type and that pump thereof intended for draft control may be of smaller capacity than the other pump.

In this way the disadvantages in the use of one single and larger pump for power lift control, draft control and the supply of external services, such disadvantages being in the form of overheating and instability when this pump was providing fluid pressure only for draft control, are avoided.

In compact manner, the tandem pump unit may have a common centre block carrying bearings for the gears of both pumps, a closure casing, one for each pump, carrying the other bearings of the respective pump, fitting onto this centre block.

Figure 2A:
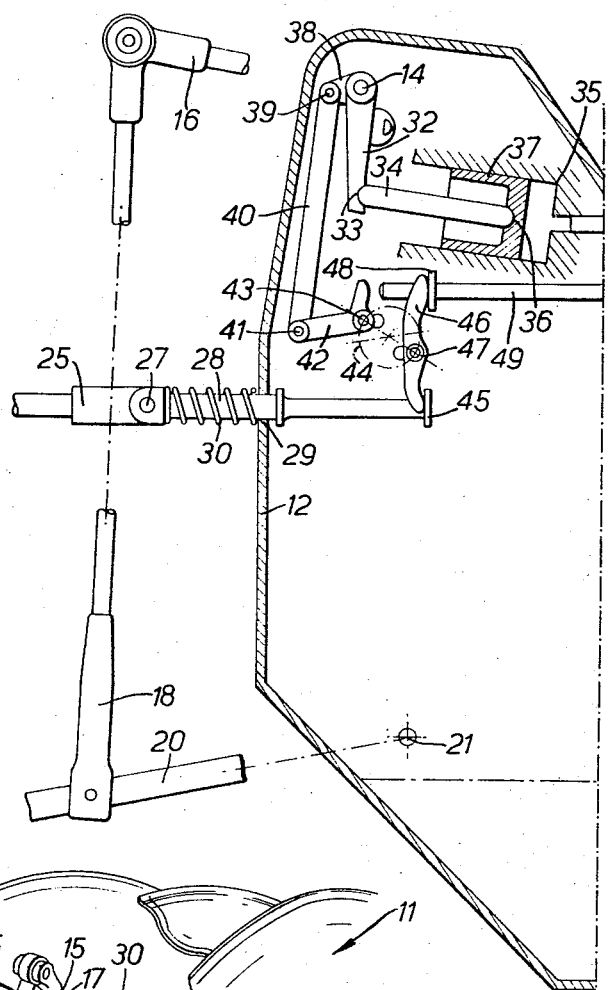
Figure 1:
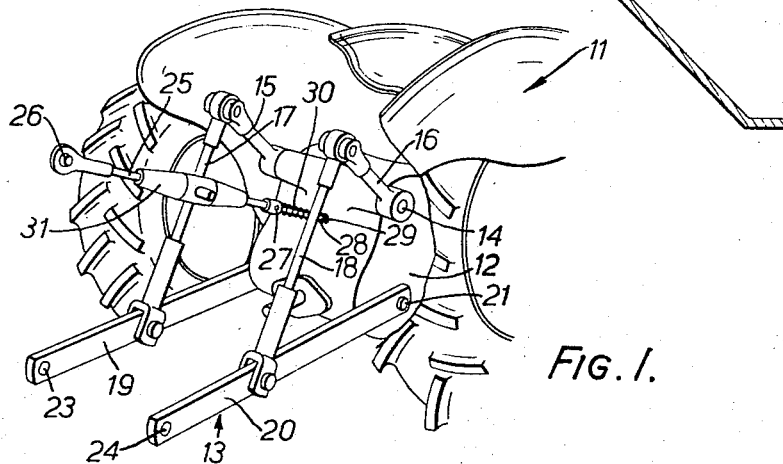

One embodiment of the invention will now be particularly described by way of example with reference to the accompanying drawings, of which, FIGURE 1 shows part of a tractor and its hitch linkage, FIGURES 2A and 2B are a diagrammatic representation of an hydraulic control system associated with the tractor shown in FIGURE 1, and, FIGURE 3 is a scrap view of a part of the system shown in FIGURE 2B.

Referring to FIGURE 1 of the drawings, a tractor 11 carries at the rearward end portion of its casing 12 a three-point hitch linkage 13 by which an agricultural implement such as a plough (not shown) can be borne by the tractor. The hitch linkage 13 comprises a cross-shaft 14 journalled in the casing 12, this shaft having a lift arm 15, 16 at each end portion, splined thereon. The two lift arms are connected by suspensory arms 17 and 18 respectively to lower or tension links 19 and 20 themselves each pivotally mounted at one end portion, as at 21, to the casing 12. Provision for pivotal connection of these two links 19 and 20 to the implement structure is made at 23 and 24 respectively.

The hitch linkage also includes a single upper compression link 25 pivotally connectible at 26 at one end portion to the implement structure and pivotally connected at 27 at its other end portion to a rod member 28 which passes through an aperture 29 in the casing 12 to the interior thereof where it engages with mechanism shown in FIGURE 2. Externally of the casing the rod member 28 is co-operable in known manner with a draft control balance spring 30. The link 25 has a length-adjusting turnbuckle 31 provided in it.

With reference now to FIGURE 2, the portion of the cross-shaft 14 within the casing 12 has a lever 32 splined thereto, this lever being ball-jointedly engaged at 33 by the piston rod 34 of a telescopic hydraulically-operated jack 35. The piston rod 34 is also ball-jointedly engaged at 36 with the piston 37 of the jack.

A shorter lever 38, set substantially at right-angles to the lever 32, is also splined upon the cross-shaft 14, being pivotally connected at 39 to one end portion of a straight link 40, the other end portion of which is pivotally connected at 41 to a bell-crank 42, itself pivotally mounted at 43 upon angularly-adjustable member 44.

At its end portion remote from the upper link 25, the rod member 28 is provided with a shoulder 45 which is in engagement with a lever 46 pivotally mounted at 47 at an intermediate point upon the angularly adjustable member 44.

It is so arranged that when the angularly adjustable member 44 is in its first position, appropriate to draft control, the lever 46 engages a shoulder 48 formed upon a rod member 49, while the free arm of the bell-crank lever 42 is held clear of that shoulder. When the member 44 is angularly-displaced to a second position, appropriate to positional control, the lever 46 is held clear of the shoulder 48 while the free arm of the bell-crank lever 42 is in engagement with the shoulder.

For its operation, the jack 35 is powered by a tandem gear pump unit 50 driven through a shaft 51 from the engine (not shown) of the tractor. The pump draws its hydraulic liquid from a reservoir through an inlet connection 52 common to both gear pumps 53 and 54 of the unit. The gear pump 53 is of smaller capacity than the gear pump 54. The gears of the gear pump 53 are mounted in inner bearings 53a and outer bearings 53b while the gears of the pump 54 are mounted in inner bearings 54a and outer bearings 54b.

The pump casing 50 comprises three parts, a central part 50a which carries the bearings 53a and 54a, and two end parts 50b and 50c which carry the bearings 53d and 54b. The end parts 50b and 50c are secured to the central part in suitable manner and the bearings 53b and 54b are suitably loaded by liquid pressure to bias all the bearings and the gears in operational sealing relation in the direction towards the central part 50a.

Operational control of the jack 35 and other associated services is by a control valve block generally indicated at 55 whose inputs comprise two manually-operable levers 56, 57 and a manually-operable rod 58.

The lever 56 is intended for draft, positional and visual control of the implement, and also for secondary services. The lever 57 is intended for control of primary services, while the plunger 58 is a selector for selecting the effective operating condition of the tandem pump unit 50, that is one or other of the pumps thereof, or both of them.

Pressure supply passageways 59 and 60 are respectively taken from the gear pumps 53 and 54 to annuli 61 and 62 formed in a bore 63. This bore houses a pump selector spool 64 having four lands 65, 66, 67 and 68. The plunger 58 is connected to the spool 64. In the bore 63 there is a further annulus 69 displaced to the right in the drawing of the annulus 62, while to the left of the annulus 61 there is an annulus 70 and just to the right of it an annulus 71.

A passageway 72 connects the passageways 59 and 60, this incorporating non-return valves 73 and 74, a relief valve 75, capable of relieving pressure in the passageway 72 to drain, also being provided. A passageway 76 is taken to an annulus 77 formed in a second bore 78 provided in the block 55. This bore houses a primary service control valve spool 79, itself connected to the lever 57 by a link 80. This spool 79 which is hollow has four lands 81, 82, 83 and 84. A second annulus 85 is provided in this bore to the left of the annulus 77 and a third annulus 86 is provided to the right of the annulus 77, being respectively connected by passageways 87 and 88 to connections 89 and 90, on the side of the block 55, which are connectible to a primary service, for example a double-acting jack (not shown).

A passageway 91 is taken from the annulus 69 in the bore 63 to an annulus 92 formed in the third bore 93 provided in the block 55. This bore is open at its right-hand end portion to reservoir and houses a spool 94 which is connected by a link 95 to the lever 56. This spool is hollow as at 96 and has five lands 97, 98, 99, 100 and 101. As well as the annulus 92, the bore 93 has six other annuli 102, 103, 104, 105, 106 and 107.

A passageway 108 connects the annulus 70 to the annulus 103, this passageway incorporating a flow control valve 109 which can spill through port 110 to reservoir. A branch passageway 111 is taken from the passageway 108 to connect with the annulus 106. This branch passageway 111 is also connected with the passageway 91 by a passageway 112 incorporating a ball valve 113.

The annulus 107 is connected by a passageway 114 to the jack 35, branch passageways 115 and 116 taken from the passageway 114 respectively connecting with annuli 102 and 104.

Two secondary service connections 117 and 118 are provided on the side of the block 55. A further branch passageway 119 is taken from the passageway 114 to the service connection 117, while the passageway 120 is taken from the annulus 105 to the service connection 118. These connections 117 and 118 are connectible to a secondary service, for example, a double-acting jack (not shown).

The hollow interior 96 of the spool 94 houses a displaceable member 121 having a single land 122 at its right-hand end portion. The left-hand end portion of this land is tapered at 123 being co-operable with radial ports 124 formed in the spool 94 between the lands 97 and 98.

At its left-hand portion, the member 121 is provided with a radial flange 125 between which and the block 55 a coil spring 126 is interposed.

The radial flange 125 bears against the rod member 49, the latter being co-axially arranged with respect to the spool 94 and supported in suitable bearings (not shown) for axial controlling movement upon the member 121.

Radial ports 94a are provided in the spool 94 placing the annulus formed between the lands 99 and 100 in communication with the hollow interior 96 of the spool. Also radial ports 79a are provided in the spool 79 placing the annulus formed between the lands 82 and 83 in communication with the hollow interior of the spool.

Associated with the control lever 56 is a quadrant 127 shown both in FIGURE 2 and FIGURE 3. The quadrant has a slot 128 which at one end portion is bifurcated to provide a pair of side-by-side slots 129 and 130.

The phases of operation of the hydraulic control system of the power lift and implement under the power of the tandem pump unit 50 will now be described. These phases of operation are Draft Control, Positional Control, Visual Control, Primary Service Control and Secondary Service Control.

DRAFT CONTROL

For Draft Control, that is the maintaining of the implement substantially at a constant operational depth in the soil, the rod 58 is set at position a, the lever 57 at neutral as drawn and the lever 56 in the slot 130 in the quadrant 127 in the draft control range. With the lever 56 so positioned, the angularly adjustable member 44 is set so that the bell crank 42 is ineffective upon the rod member 49, but so that the lever 46 is in engagement with the shoulder 48 formed on the rod member 49. Also with the lever 56 so positioned, the spool 94 is in the position drawn so that passageway 91 is in communication with reservoir through the open end of the bore 93.

With the rod 58 at position a, the delivery of the smaller gear pump 53 of the tandem gear pump unit 50 is delivering through the passageway 59, the annuli 61 and 70, the passageway 108, the flow control valve 109, the annuli 103 and 104, the passageway 116 and the passageway 114 to the jack 35. The larger gear pump 54, however, is by-passing back to reservoir through the passageway 60, the annuli 62 and 69, the passageway 91 and the bore 93.

The pressure in the passageway 111 maintains the ball valve 113 closed and with the spool 94 in its draft position, pressure liquid present in the passageway 111 can get no further than the annulus 106.

With the lever 56 at the right-hand end of the slot 130, which is appropriate to the maximum height condition under draft control, a minimum flow of liquid is permitted by the land 122 to spill radially-inwardly through the ports 124 into the interior 96 of the spool 94 and thence to reservoir. As the lever 56 is moved further to the left in the draft control range, the spool 94 moves correspondingly further to the left to increase the spill flow through the ports 124 until at the extremity of the slot 130, the lever is in a position appropriate to the minimum height condition under draft control.

The jack 35 positions the hitch linkage 13 so that the implement is placed at the depth in the soil required by the precise setting of the lever 56 in the slot 130 and the implement is maintained substantially at this pre-set depth.

If, however, the implement encounters soil of such heavier or obstructive nature as to apply an undesirably high drag upon the tractor, the compression link 25 is displaced to the right in FIGURE 2, against the effort of the draft control balance spring 30. In consequence, the lever 46 is caused to move in an anti-clockwise direction above the pivot 47 under the bias of the coil spring 126, the member 121 moving to the left in the drawing so that the amount of liquid spilling through the ports 124 to reservoir is reduced, whereupon a higher liquid pressure is built up in the jack 35, causing the jack to be extended and the implement to be raised by an amount appropriate to the displacement of the compression link 25. Thus the tractor continues its operation at the appropriately reduced draft whilst working this heavier soil. Upon return to soil of a less dense nature, the balance spring 30, being sensitive to this condition, is operative to cause the lever 46 to be moved in a clockwise direction, the rod member 49 being thereby axially displaced to the right in FIGURE 2 to displace the member 121 also to the right. Hence the spill of liquid to reservoir through the ports 124 is increased so that the jack 35 contracts. Thus the implement is caused to penetrate more deeply into the soil.

POSITIONAL CONTROL

For Positional Control, the rod 58 is maintained in the same position as for draft control, while the lever 57 is maintained in neutral. The lever 56 is moved from the slot 130 in the quadrant 127 into the slot 129. In its transverse movement from the slot 130 into the slot 129, by suitable linkage (not shown) the angularly-adjustable member 44 is so moved as to cause the lever 46 to become dis-engaged from the shoulder 48 and to cause the free arm of the bell-crank 42 to engage the left-hand end portion of the rod member 49. In this way a feed-back linkage is provided by the link 40 and the bell-crank 42 from the output side of the jack 35 to the displaceable member 121.

When the lever 56 is in the right-hand end portion of the slot 129, this is appropriate to maximum raise positional control of the implement. Here the spool 94 is in a position in which no spill of liquid is permitted to drain through the ports 124, so that the entire delivery of the smaller gear pump 53 is passing to the jack 35. As with draft control, the larger gear pump 54 by-passes to reservoir.

As the lever 56 is moved to the left in its slot 129 in the quadrant 127, the spool 94 also moves to the left in its bore 93 and with respect to the member 121, so that the land 122 progressively opens the ports 124, thereby to permit spill of liquid to reservoir from the passageways 114 and 115. Hence, with such movement of the lever 56 to the left, progressively more liquid is spilled so that the jack 35 is progressively contracted for the positional lowering function of the implement.

During such movement of the lever 56 in the positional control range, the feed-back linkage 40/42 is operative. Thus, when the lever is moved to a particular point in the range appropriate to a particular position of the implement, the spool 94 is set to the particular new spill condition of the ports 124, whereupon the jack 35 extends or contracts accordingly, its movement being fed back through the linkage 40/42 onto the members 49 and 121. When the required position of the implement is reached, the land 122 is so positioned with respect to the ports 124 that movement of the jack is caused to cease and the implement is held in its new position required by the setting of the lever 56.

Such positional control is required where operation of the implement by vision of the operator is not desired or is difficult.

VISUAL CONTROL

For Visual Control, the rod 58 is maintained in its position $a$, and the lever 57 is maintained in its neutral position. The lever 56 however is moved in the clockwise direction into the slot 128 in the quadrant 127 and thus into its range which includes the "Raise," "Neutral," and "Lower" positions shown, which is the Visual range. When the lever 56 is in its "Neutral" position, the land 97 closes over the passageways 108, 115 and 116 while the land 101 closes over the passageway 92, at their junctions with the bore 93. Under such positioning, neither the draft control linkage nor the positional control feed-back linkage have any effect upon the control valve unit.

In the "Neutral" position of the spool, the annulus formed between the lands 99 and 100 is in registry with the annulus 106, thus placing the annulus 106 and passageway 111 in communication through the hollow interior 96 of the spool 94 and the bore 93, with reservoir.

The gear pump 53 is delivering through the passageways 108 and 111 to the annulus 106, the flow control valve being closed by the equalised pressures across it and thus no longer affords spilling, while the gear pump 54 is delivering through the passageway 91 and ball valve 113 into the passageway 111 and thus also to the annulus 106. The combined flow from both pumps is therefore by-passing to reservoir. When the lever 56 is moved in the anti-clockwise "Raise" direction, the spool 94 moves to the left in the drawing, the annulus formed between the lands 100 and 101 placing the annuli 106 and 107 in communication, whereby the two gear pumps 53 and 54 no longer by-pass to drain but instead both deliver pressure liquid into the passageway 114 and thus to the jack 35 to extend it and thereby raise the implement. When the lever 56 is moved in the clockwise direction from the "Neutral" position towards "Lower," the spool is moved to the right in the drawing. In consequence, the annulus formed between the lands 99 and 100 is brought into registry with the annulus 107 whereupon liquid in the passageway 114 passes therefrom through the ports 94a into the interior 96 of the spool 94 and thence through the bore 93 to reservoir. Thus the jack 35 contracts so that the implement is lowered.

With such control the neutralising of the spool 94 is effected by the operator himself when he observes the arrival of the implement at the position he desires.

Since both pumps of the tandem pump unit 50 are effective for visual control, much more rapid operation is provided than with positional or draft control. However, if the rod 58 is moved to its position $c$, only the smaller pump 53 delivers through the annulus between lands 66 and 67, the annulus 70 and passageways 108 and 111 into the annulus 106, so that functioning under visual control then occurs at a slower rate. With the rod 58 in this position the spool 64 is set such that the larger pump 54 delivers through the passageways 76 to the control spool 79 of the primary service.

PRIMARY SERVICE CONTROL

With the spool 94 in the "Neutral" position and the rod 58 in its position $b$, the larger pump 54 is by-passing to reservoir through the annulus between lands 67 and 68 on the spool 64, the annulus 69, passageway 91, ball valve 113, annulus 106, ports 94a and bores 96 and 93. The smaller pump 53, however, is delivering through the annulus between the lands 66 and 67, annulus 71 and passageway 76, to the annulus 77 in the bore 78, and thence to reservoir through ports 79a and the interior of the spool 79. Thus as soon as the lever 57 is moved in the anti-clockwise direction, pressure liquid passes through the annulus formed between lands 81 and 82, annulus 85 and passageway 87 to the primary service connection 89. Thereafter, this liquid passes to the primary service, in this case a double-acting telescopic jack (not shown) thereby to operate the service, exhaust from the other side of the service passing back through the connection 90, passageway 88, annulus 86, port 79a and the hollow interior of the spool to reservoir.

When the lever 57 is moved in the clockwise direction, converse operation of the primary service occurs.

If the rod 58 is moved to its position $d$, then the deliveries of both smaller and larger gear pumps pass into the annulus between lands 67 and 68, the annulus 71 and the passageway 76, so that the primary service is then operable under the power of both pumps.

If the rod is moved to its position $c$, then the delivery from the larger pump 54 only passes through the annulus between lands 67 and 68, annulus 71 and passageway 76, to the primary service. However, in this position of the spool 64, the smaller pump 53 is delivering into the passageways 108 and 111 and thus to the annulus 106. This smaller pump delivery can be for slow visual control, as previously explained, or for slow operation of the secondary service.

SECONDARY SERVICE CONTROL

With the spool 94 in the "Neutral" position in the "Visual" range and with pressure liquid from the smaller pump 53 available in the annulus 106 as mentioned in the previous paragraph, this liquid passes to reservoir through the ports 94a. However, if the jack 35 is mechanically locked, the system is in readiness for operation of the secondary service, in this case a further double-acting telescopic jack (not shown). When the lever 56 is moved towards "Raise," the spool 94 is displaced to the left in the drawing whereupon pressure liquid present in the annulus 106 passes through the annulus between lands 100 and 101 into the passageway 114 and through the passageway 119 and secondary service connection 117 into the secondary service. Since the jack 35 is locked the service is able to operate at slow rate, exhausting fluid from the other side thereof passing back to reservoir through the service connection 118, the passageway 120, the ports 94a and the bores 96 and 93.

If the lever 56 is moved in the "Lower" direction, from the "Neutral" position in the "Visual" range, the spool 94 is moved to the right so that the pressure liquid in the annulus 106 passes through the annulus between lands 98 and 99 into the passageway 120, and through the secondary service connection 118 to the previously low pressure side of the secondary service, exhausting liquid from the other side thereof passing to reservoir through the connection 117, the passageways 119 and 114, the ports 94a and the bores 96 and 93.

When the rod 58 is in the position a, the spool is set for the deliveries of both gear pumps 53 and 54 to be directed to the annulus 106. Thus with the jack 35 mechanically locked, the secondary service can be operated in a manner similar to the operation described in the preceding paragraph but at fast rate under the power of both pumps.

Thus by the use of the tandem pump unit 50 provision is made in dependence upon the settings of the spools 64, 79 and 94 for the slow or fast operational movements under draft control, positional control, or visual control or again primary and secondary service control.

The arrangement of the ball valves 73 and 74 in conjunction with the relief valve 75 is such that although some heat is generated by the delivery of the smaller pump, the amount of heat is not so great as would be the case with a single larger pump as hitherto used for operation of the power lift, draft control and operation of external services, when such a larger pump is being utilised only for small flows appropriate to draft control, consequently with a very large amount of fluid passing through an associated relief valve to drain.

I claim as my invention:

1. A tractor or like agricultural vehicle having a fluid-pressure-operable power lift, a hitch linkage carried upon the vehicle, and an implement, for example a plough, carried by the hitch linkage, which linkage is operable by the power lift under visual control, draft control and positional control, wherein the improvement comprises the provision of:
   (a) a tandem pump unit (50), itself comprising two pumps (53, 54) contained in a casing (50a, 50b, 50c), common to both, each pump having respective delivery conduits (59, 60) taken therefrom,
   (b) a selector spool (64) associated with said conduits (59, 60) and capable in a first operative position thereof of directing both fluid supplies from said tandem pump unit to the power lift for operation thereof under visual control, or alternatively capable in a second operative position thereof of directing one of said fluid supplies to the power lift for draft or positional control of the implement while the other of said supplies is caused to pass direct to reservoir, and,
   (c) control means (25, 30, 94, 121, 124) associated with the power lift for draft control of the implement and effective only when said selector spool (64) is in its said second position.

2. In combination, a vehicle having a hitch (19, 20, 25) thereon for carrying an agricultural implement therewith, and an operating mechanism for controlling the hitch comprising a fluid-pressure-operated power lift (17, 18) for the hitch, means including a tandem pump unit (50) hydraulically interconnected with the power lift for visual control of the hitch, said pump unit comprising a pair of pumps (53, 54) having a common shaft 51 but separate deliveries (59, 60) therefrom, means (115, 124, 98, 121) responsive to variation in the setting of the hitch, to alter fluid flow in the interconnection (114) between the pumps and the power lift, for draft or positional control of the hitch, means including a two-position control valve (94) for converting the control mechanism from visual control to draft or positional control, or vice versa, said control valve (94) being operative in one position (128) thereof to render the visual control means operative while rendering the draft or positional control means inoperative, and operative in the other position (129, 130) thereof to render the draft or positional control means operative while rendering the visual control means inoperative, and means (91, 92, 106), etc. responsive to selection of the aforesaid one position (128) of the control valve to direct the combined deliveries of the pumps to the power lift, and to selection of the aforesaid other position (129, 130) of the control valve to direct the delivery of one pump to the power lift while dumping the delivery of the other pump to reservoir.

3. A tractor as claimed in claim 1, wherein the tandem pump unit is of gear type.

4. A tractor as claimed in claim 1, wherein that pump of the tandem pump unit intended for draft control is of smaller capacity than the other pump.

5. A tractor as claimed in claim 3, wherein the tandem pump unit has a common centre block carrying bearings for the gears of both pumps, and closure casings, one for each pump, which closure casings carry the other bearings of the respective pump and themselves fit onto the centre block.

6. A tractor as claimed in claim 5, wherein the said other bearings have areas subjected to pressure loading by pump delivery pressure in a direction towards the centre block thereby to maintain the respective gears and bearings in operable sealing engagement.

7. A tractor as claimed in claim 1, wherein the power lift comprises a piston-and-cylinder device operably connected to the implement through said hitch linkage, valve means being provided which are manually operable in a first range for visual control of the power lift and implement under fluid pressure supplied by either one or both of the pumps of said tandem pump unit.

8. A tractor as claimed in claim 7, wherein the valve means is also manually operable in a second range (the draft control range), wherein only the delivery from one pump of said tandem pump unit is directed to the power lift, the draft control means including a fluid spill valve arranged in co-operable association with the pressure side of the power lift and operable in dependence upon the working load on the implement to maintain the power lift at a substantially constant setting, thereby to afford the implement substantially constant draft.

9. A tractor as claimed in claim 8, wherein with the valve means in said second range, a compression link (25) forming part of the hitch linkage, is connected with a rod member (49) which itself engages the spill valve (93), the compression link being operable to transmit signals, proportional to the working loads upon the implement, to the spill valve for automatic draft control of the implement.

10. A tractor as claimed in claim 9, wherein angularly-adjustable means (44) are provided so that when said valve means is moved into a third range (the positional control range) the connection between the compression link and the rod member (49) is broken such that the spill valve is caused to be no longer operable under the control of said compression link, but instead the rod member is linked to a feedback mechanism taken thereto from the power lift, so that with selective movement of the valve means in said third range and with consequent displacement of the power lift, neutralising of the effect of the valve means is caused by follow-up displacement of the feedback linkage and of the spill valve as the power lift reaches its selected position.

11. A tractor as claimed in claim 7 and arranged to carry a primary fluid-pressure-operable service, wherein said selector spool is movable to a further position in which it can direct the fluid delivered by the pump unit to a primary service control valve, itself capable of controlling the supply and return of fluid to and from the primary service, so that either one or both pumps of the tandem pump unit are connectible to power the primary service.

12. A tractor as claimed in claim 7 and arranged to carry a secondary fluid-pressure-operable service, operable when the power lift is mechanically locked and capable of receiving fluid under pressure from either one or both of the pumps of the tandem pump unit in dependence upon the relative settings of the pump selector spool and said valve means.

13. The combination according to claim 2 wherein the draft or positional control means including a spill valve (115, 124, 98) in the interconnection (114) between the pumps and the power lift, and feedback means (121, 126), etc. responsive to variation in the setting of the hitch, to alter the position of the spill valve (98).

14. The combination according to claim 13 wherein the spill valve (98) is opened by the control valve (94) in the aforesaid other position thereof, and closed by the control valve in the aforesaid one position thereof.

15. The combination according to claim 2 wherein the hitch has two links (25) and (19, 20), one of which (19, 20) is connectable with the implement for positional control, and the other of which (25) is connectable with the implement for draft control, and wherein the feedback means include a separate feedback mechanism (40, 43 or 28, 46) for each link, to alter the position of the spill valve, there being means (44) for converting the feedback means for control by one feedback mechanism to the other, and vice versa.

16. The combination according to claim 2 wherein the last-named means include a dump outlet (92) in the interconnection (59, 60, 108, 91, 114) between the pumps and the power lift, which is opened and closed by a portion of the control valve in the respective positions thereof.

References Cited
UNITED STATES PATENTS

| | | | |
|---|---|---|---|
| 1,932,761 | 10/1933 | West | 60—52 |
| 2,675,751 | 4/1954 | Weber | 172—7 |
| 3,002,571 | 10/1961 | Kersey et al. | 172—9 |
| 3,053,234 | 9/1962 | Cheureau | 172—9 |
| 3,183,977 | 5/1965 | Heckenkamp et al. | 172—7 |

ABRAHAM G. STONE, *Primary Examiner.*

WILLIAM A. SMITH III, *Examiner.*

J. R. OAKS, *Assistant Examiner.*